US012083632B2

(12) United States Patent
Tamm et al.

(10) Patent No.: US 12,083,632 B2
(45) Date of Patent: Sep. 10, 2024

(54) ORBITAL WELDING APPARATUS

(71) Applicant: Illinois Tool Works Inc., Glenview, IL (US)

(72) Inventors: Markus Tamm, Überlingen (DE); Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 410 days.

(21) Appl. No.: 17/308,538

(22) Filed: May 5, 2021

(65) Prior Publication Data

US 2021/0346970 A1 Nov. 11, 2021

(30) Foreign Application Priority Data

May 7, 2020 (DE) .......................... 102020112463.5
Apr. 8, 2021 (EP) ..................................... 21167375

(51) Int. Cl.
*B23K 9/028* (2006.01)

(52) U.S. Cl.
CPC .................................. *B23K 9/0286* (2013.01)

(58) Field of Classification Search
CPC .... B23K 9/00; B23K 9/0286; B23K 37/0276; B23K 37/053; B23K 37/0533
See application file for complete search history.

(56) References Cited

U.S. PATENT DOCUMENTS

| 5,571,431 A | 11/1996 | Lantieri |
| 2005/0247686 A1 | 11/2005 | Child |

(Continued)

FOREIGN PATENT DOCUMENTS

| DE | 102012223214 | 6/2014 |
| DE | 102017122069 | 3/2019 |

(Continued)

OTHER PUBLICATIONS

European Search Report Appln No. 21167375.1 dated Nov. 4, 2021.
European Search Report Appln No. 21167375.1 dated Nov. 16, 2022.
European Exam Report Appln No. 21167375.1 dated Jul. 28, 2023.

*Primary Examiner* — Brian W Jennison
(74) *Attorney, Agent, or Firm* — McAndrews, Held & Malloy, Ltd.

(57) ABSTRACT

The disclosure relates to an orbital welding head for an orbital welding apparatus for connecting by means of a cable to a welding current source in a welding current source housing, said current source being equipped with a base controller. The orbital welding head has a tube mount and a welding electrode holder rotatably supported opposite the tube mount for mounting a welding electrode, wherein the orbital welding apparatus has a motor, which is configured in order to drive the welding electrode holder and thus rotate it opposite the tube mount, wherein the orbital welding head has a chamber for inert gas, which is configured in order to surround the welding electrode of the orbital welding head during a welding process and to essentially terminate it outwardly. The orbital welding head has an electronic circuit, which has a memory arranged in the orbital welding head. The electronic circuit is configured in order to store one or more electrode load values of the welding electrode. The electronic circuit of the orbital welding head and/or the base controller is configured such that a maintenance state value of the welding electrode is determined on the basis of the electrode load values, said state being a measure of wear on the welding electrode.

11 Claims, 2 Drawing Sheets

(56) References Cited

U.S. PATENT DOCUMENTS

| | | | | |
|---|---|---|---|---|
| 2008/0245775 A1* | 10/2008 | Opderbecke | ........... | B23K 9/167 |
| | | | | 219/121.45 |
| 2010/0051586 A1 | 3/2010 | Guerrina | | |
| 2015/0306691 A1 | 10/2015 | Naber | | |
| 2017/0021442 A1* | 1/2017 | Denis | ..................... | B23K 9/124 |
| 2019/0091788 A1* | 3/2019 | Tamm | ................... | B23K 37/053 |
| 2019/0344376 A1* | 11/2019 | Sawanishi | ............. | B23K 11/115 |

FOREIGN PATENT DOCUMENTS

| | | |
|---|---|---|
| EP | 3424633 | 1/2019 |
| EP | 3650157 | 5/2020 |

\* cited by examiner

ORBITAL WELDING APPARATUS

FIELD OF THE DISCLOSURE

This disclosure relates generally to orbital welding apparatuses of the so-called closed or open design.

BACKGROUND

The prior art US20100051586A1 discloses a representative of these particular welding apparatuses. These types of welding apparatuses are particularly found in the medical or food technology field, where inert gas-welded, high-quality welding seams using stainless steels often have very small tube diameters (a few centimeters). Accordingly, this design is characterized by compact dimensions and ease of use.

SUMMARY

The problem solved by this disclosure is to further develop an orbital welding head, an orbital welding apparatus, and a method for orbital welding in such a way that a welding seam can be reliably produced with high quality and that faults during welding can be avoided.

The problem is solved by the independent claims. Advantageous embodiments are specified in the respective subclaims.

An orbital welding head according to this disclosure for an orbital welding apparatus is configured to be connected to a welding current source in a welding current source housing by means of a cable, said current source being equipped with a base controller. The orbital welding head has a tube mount and a welding electrode holder rotatably arranged opposite the tube mount in order to mount a welding electrode. The orbital welding apparatus has a motor, which is configured to drive the welding electrode holder and thus to rotate it opposite the tube mount, wherein the orbital welding head can have a chamber for inert gas, which is configured to surround the welding electrode of the orbital welding head during a welding process and to essentially terminate it outwardly. The orbital welding head is equipped with an electronic circuit.

According to a first aspect of the disclosure, the orbital welding head is characterized in that the electronic circuit has a memory arranged in the orbital welding head in order to store one or more electrode load values of the welding electrode, and the electronic circuit of the orbital welding head and/or the base controller is configured such that a maintenance state value of the welding electrode is determined on the basis of the electrode load values, said state being indicative of a measure of wear on the welding electrode.

According to a second aspect of the present disclosure, the orbital welding head is characterized in that the electronic circuit has a memory arranged in the orbital welding head, wherein the electronic circuit is configured to store one or more electrode load values of the welding electrode, and the electronic circuit of the orbital welding head and/or the base controller is configured such that one or more electrode load values are initially stored as reference values and the wear on the welding electrode is determined by comparing one or more further electrode load values to the reference value(s).

The welding electrode is the most important wear part of such an orbital welding apparatus. It usually needs to be replaced at regular intervals. Conventional orbital welding apparatuses have a base controller with "high" intelligence, i.e. a processor and a memory in which data of the orbital welding apparatus can be stored and evaluated. In principle, it would be possible to measure the welding current with a base controller and use this in order to assess the electrode load and the maintenance state of the welding electrode. However, practically speaking, this makes little sense, because different orbital welding heads are connected to a welding current source housing depending on the tube diameter of the tubes to be welded. This means that there is no clear assignment of orbital welding heads to welding current source housings. The orbital welding heads are replaced and also connected to different welding current source housings. Thus, it cannot be ensured that the base controller arranged on a welding current source housing can monitor all welding operations performed with a particular orbital welding head, because the orbital welding head can also be connected to a different orbital welding [current] source housing with a different base controller. Even if a clear identification of the orbital welding head by the base controller is possible, the latter cannot measure the actual load state of the orbital welding head or its welding electrode.

This problem is solved by this disclosure in that the memory is provided for storing the electrode load values on the orbital welding head. Thus, the corresponding electrode load values can be stored on the orbital welding head regardless of to which welding current source housing the orbital welding head is connected. The electrode load values can be generated by the base controller at the welding current source and/or at the orbital welding head. This is explained in more detail below. By storing the electrode load values on the orbital welding head itself, they can be carried along and supplemented during any welding operation, regardless of to which welding current source housing the orbital welding head is connected. This allows for a full detection of all electrode load values and for a correct maintenance state of the welding electrode to be determined.

In the method according to the second aspect, it is advantageous that it is suitable for different welding electrodes and different welding programs for orbital welding without the need for specific adjustment. In addition, aging phenomena of the welding apparatus, such as a resistance of a cable between the orbital welding head and the welding current is source housing that changes over time, are compensated.

The electrode load values can have one or more of the following parameters:

The welding voltage measured at the welding electrode. Taking into account the applied welding current, the currently measured voltage can be used in order to directly determine the state of the welding electrode. However, it can also make sense to measure and store the voltage absolutely or as a ratio of the welding current during each individual welding operation in order to be able to track the change in the state of the welding electrode on the basis of the development of the voltage compared to the current.

The resistance measured at the electrode. This resistance is the ratio between the measured voltage and the applied welding current. This resistance includes the conductive resistance and the arc resistance. Insofar as there is no fundamental defect in the orbital welding apparatus, the conductive resistance can essentially be assumed to be constant. Measured changes in the resistance therefore primarily mean changes in the arc resistance. When the resistance changes significantly, this means high wear on the electrode.

All electrical work performed on the welding electrode or the entire electrical charge flowing through the welding electrode. Both are measurands that are a measure of the continuous load on the welding electrode. The welding electrode must be replaced when predetermined, empirically calculated threshold values are reached.

The total electrical active energy performed by the welding electrode. The electrical active energy is a very meaningful electrode load value when applying AC current to the welding electrode.

The maximum current per welding operation or the electrical charge per welding operation or the electrical work or active energy per welding operation. These electrode load values, which are specific to the individual welding operation, can be measured and stored and evaluated statistically.

Total operating time. The total operating time with which the electrode is operated, i.e. the time during which current flows through the welding electrode, is a very significant electrode load value. As soon as a predetermined, empirical threshold is reached, the latter must be replaced for the entire maximum operating time of a welding electrode.

Generally, the measured voltage in combination with the applied current is the preferred electrode load value. The voltage relative to the current is a measure of the arc resistance. The arc resistance at currents greater than 20 A behaves approximately linearly to the distance between the tip of the welding electrode and the object to be welded and is thus approximately proportional to the length of the arc. In an orbital welding apparatus in which the electrode is not automatically readjusted, as is the case here, the tip of the welding electrode is changed during welding due to the removal of material. This increases the distance between the tip and the object to be welded. This leads to an increase in voltage.

The tips of the welding electrodes are ground at a predetermined angle, which can vary depending on the electrode. The removal of material renders the tip blunter. This results in a widening of the arc and an increase in the measured voltage.

There are thus two causes—the increasing distance and the changing shape of the tip—which lead to an increase in the measured voltage at constant current.

In a very simple embodiment, only values of the measured voltage for a predetermined constant current strength are stored as maintenance state values.

For example, these maintenance state values can be monitored and evaluated in two ways:

1. The curve of the voltage change can be sensed via the number of welding operations, the arc energy, or the time. If the welding electrode is in order, this curve is substantially linear. If the curve deviates from a linear curve, this means that there is significant wear on the electrode. Depending on the selection of the maintenance state value, the curve can also have a function other than a linear function, e.g. an exponential or hyperbolic function. This function lies in the nature of the measurand, which is used as the maintenance state value.

2. When a maintenance state value is overshot or undershot, this is assessed as significant wear on the electrode.

Orbital welding apparatus users have different welding seam requirements. In certain applications, such as for tubes for transporting food, the welding seams must be very clean, i.e. no contaminants can be introduced into the tube during welding. The inner surface of the welding seams must also be smooth, so that no reservoirs of contaminants accumulate. On the other hand, there are applications in which the welding seam strength is the focus. Here, the surface can be rough. By contrast, when welding stainless steel tubes for handrails, the outer surface of the welding seam must be visually smooth, and the welding seam must be as narrow as possible.

The deviation from the linear curve, which is to be evaluated as intolerable wear, and the threshold value must therefore be determined empirically by the individual user according to his or her needs. As soon as one or both of these empirical values are established, a user can take advantage of the service life of a welding electrode significantly more efficiently. He or she can always use an optimal electrode for very demanding welds or, with lower requirements for the welding seam, can make maximum use of the service life of the welding electrode.

The costs and time required for the necessary replacement of the welding electrodes can thus be optimized, so that a considerable cost optimization is achieved while maintaining the desired welding quality compared to the conventional replacement at fixed replacement intervals after, for example, 50 to 100 welds.

If the welding head is incorrectly operated, in that it is opened with a welding electrode that is still annealing so that the welding electrode comes into contact with the ambient atmosphere, the welding electrode will be damaged thereby. In the next welding operation, damage to the welding electrode is detected, because the voltage increases abruptly at the same current level. This leads to a significant deviation of a linear curve of the welding voltage (see 1) and, in the case of significant damage to the welding electrode, leads to an excess of the threshold value (see 2.). Thus, such an incorrect operation can be detected immediately. It can also be detected when the welding electrode is damaged due to inadequate supply of inert gas, which can have different causes.

When using one or more reference values, a threshold can be predetermined by a factor that is multiplied by the reference value in order to give the threshold. For example, if this factor is 0.8 or 1.2, this means that the threshold is 0.8 times or 1.2 times the corresponding reference value. A plurality of threshold values can also be provided, is each of which can be assigned to an alarm or warning level. When one of the thresholds is overshot or undershot, a corresponding alarm or warning signal is then output. These factors can be determined once by the user and then applied to different welding electrodes and/or different welding programs. Here, for certain groups of welding electrodes and/or groups of welding programs, it can also be expedient to provide respectively different threshold values or different thresholds for deviations of profiles or different factors for determining the threshold values and/or thresholds for deviation on the basis of the reference values.

In an automatic monitoring of the wear on the welding electrode, an operator can operate a plurality of orbital welding apparatuses simultaneously, wherein a problem arising from the wear of one of the welding electrodes can be detected reliably and in a timely manner.

The orbital welding head can have a monitoring module with which the storage of a predetermined curve and/or the undershooting or overshooting is automatically monitored. A warning is generated when an unacceptable wear is detected. The warning can be output with a corresponding output device directly at the orbital welding head, for example by means of an acoustic and/or optical signal. The monitoring module is preferably configured such that a deviation threshold for a predetermined deviation of the curve of the determined maintenance state values and/or a threshold for overshooting or undershooting this threshold is settable or changeable by the determined maintenance state values. As a result, a user of the orbital welding head can determine when a warning should be issued, thus adjusting the operation of the orbital welding head to his or her individual needs for quality and economy of the welding process.

Such a monitoring module can also be provided on the base controller when there is a data link between the base controller and the orbital welding head, such that the base controller, stored in the orbital welding head, can read out and process the maintenance state values.

The curve of the determined maintenance state values can be sensed via the welding operations, the arc energy, or the time. For example, when the state values are sensed via the welding operations, one maintenance state value or a plurality of maintenance state values can be sensed per welding operation.

A welding operation is a complete welding of two tube ends, meaning that a welding seam between two tube ends is produced in its entirety. When multiple maintenance state values are sensed during one welding operation, they are preferably assigned to predetermined points of the welding operation, such as the start, middle, or end. This assignment of the individual maintenance state values within a welding operation can be done by the elapsed time since the start of the welding operation and/or by a determined angular position of the welding electrode in the orbital welding head.

Because, in many orbital welding processes, the current strength is varied during a welding process in which the welding electrode is guided once around the tubes to be welded together, it can be expedient to sense both the voltage and the applied current and to evaluate the voltage in relation to the corresponding current value.

This method is preferably used in the TIG welding process (Tungsten Inert Gas), in which a welding electrode made of a tungsten alloy and a corresponding inert gas is used.

Preferably, the orbital welding head has a resetting device for resetting the one or more electrode load values when replacing a welding electrode. The resetting device can be configured such that when a welding electrode is replaced, all electrode load values previously stored are deleted. However, it can also be configured such that a new data set is applied for the new welding electrode. The latter is preferred, because data from previously used welding electrodes is thus kept available and sensed over the entire useful life of the orbital welding head, so that the load of the entire orbital welding head can also be assessed. The resetting device can be configured in order to manually actuate, preferably requiring authorization by means of an authorization code in order to operate the resetting device. However, the welding electrodes can also be equipped with a machine-readable coding. Then, when replacing a welding electrode, the electrode load values are automatically reset using the resetting device.

The orbital welding head can be equipped with a dispensing device to indicate a maintenance state of the welding electrode located in the orbital welding head. This output device can be an optical output device, for example lighting elements, for example LEDs, or a display screen. However, the output device can also be an acoustic output device for outputting an acoustic warning signal.

The orbital welding head can have a communication device for communicating with the base controller via a bidirectional digital data link. This allows the orbital welding head and the base controller to mutually exchange information. This is very advantageous, because a plurality of parameters are on the base controller anyway, which allow a statement to be made regarding the maintenance state of the welding electrode, and are thus suitable as electrode load values. For example, the base controller specifies the current strength of the welding current so that the current strength of the welding current is present on the base controller. Through the digital data link, the current strength can be transmitted to the orbital welding head and stored there as an electrode load value. It is therefore not necessary to provide a separate current sensor on the orbital welding head.

Further parameters that are suitable as electrode load values are all parameters with which the base controller controls the supply of the inert gas. These parameters can also be transmitted to the orbital welding head and stored there as electrode load values. For example, if little inert gas is supplied, this means a significantly greater wear on the welding electrode compared to a welding operation in which the usual amount of inert gas is supplied. This can be important for assessing the maintenance state of the welding electrode.

However, sensors for monitoring the welding process, such as a temperature sensor, a gas sensor, etc., can also be provided directly on the orbital welding head. If there is no data link to the base controller, then it can also be expedient to provide a current sensor, such as a Hall sensor, on the orbital welding head in order to measure the welding current. These sensors can be read directly on the orbital welding head, and their sensor values can be stored as electrode load values. Preferably, the orbital welding head has a processor with which the sensed sensor values are processed and evaluated. By preparing the sensor values in this way, the amount of data to be stored can be significantly reduced. In this preparation, a statistical analysis is preferably carried out, with which a mean value, a median value, maximum and/or minimum values, and integrals are determined via the time of the values.

Another aspect of the present disclosure relates to an orbital welding [apparatus] having a welding current source in a welding current source housing, said current source being equipped with a base controller. The orbital welding apparatus is characterized by an orbital welding head described above. The base controller can be integrated into the welding current source housing or can be formed with a separate housing and can be connected to the welding current source housing.

Preferably, the base controller has a base communication device for communicating via the bidirectional digital data link with the communication device of the orbital welding head. The base controller is configured in order to read one or more electrode load values, which are present on the base controller and/or the welding current source and/or measured on the welding current source by means of one or more sensors, as well as the electrode load values on the orbital welding head. The base controller can thereby transmit electrode load values to the orbital welding head, which stores them in its memory.

When executing a welding program, the base controller can consider the maintenance state of the welding electrode defined by the electrode load values stored in the orbital welding head. A welding program can be adjusted to the maintenance state of the welding electrode, and/or the maintenance state of the welding electrode can be considered when selecting one of a plurality of welding programs.

For example, the maximum welding current can be limited depending on the maintenance state of the welding electrode. Accordingly, the welding speed, or the speed at which the welding electrode holder in the orbital welding head is moved, must also be adjusted. The welding program can thus be calibrated as a function of the maintenance state of the welding electrode.

According to a further aspect of the present disclosure, a method is provided for operating an orbital welding apparatus, wherein current is passed from a welding current source via a cable to an orbital welding head, and a welding electrode holder is driven on the orbital welding head by means of a motor and is rotated opposite a tube mount of the orbital welding head. During a welding process, a welding electrode of the orbital welding head, which is held by the welding electrode holder, is surrounded by a chamber for inert gas and is essentially terminated outwardly.

According to a further aspect, this method is characterized in that, by means of an electronic circuit, one or more electrode load values of a welding electrode are stored in a memory arranged in the orbital welding head and a maintenance state of the welding electrode is determined by means of the electronic circuit of the orbital welding head and/or by means of the base controller using the electrode load values, said state being indicative of a measure of wear on the welding electrode.

This method can also be characterized in that, by means of an electronic circuit, one or more electrode load values of a welding electrode are stored in a memory arranged in the orbital welding head, and one or more electrode load values are initially stored as reference values and the wear on the welding electrode is determined by comparing one or more further electrode load values to the reference value(s).

In this method, preferably an orbital welding head and/or an orbital welding apparatus as described above are used.

The cable can have a minimum length of 1 m, preferably 2 m, particularly preferably 5 m. The tube mount is preferably a pincer-like clamping mount. The welding current source is preferably stationary, while the orbital welding head is manually portable.

The chamber is preferably configured such that the tube pieces that are to be welded together are surrounded by the chamber at the ends to be joined. The chamber can have an input, e.g. with a hose connector, for inert gas, with which the chamber can thus be filled. The existing air is then pushed out of the chamber through the aforementioned small gaps or apertures. The chamber can also have a dedicated gas output.

The chamber is preferably designed such that the welding electrode in the chamber can be rotated about the tube pieces to be welded.

According to the present disclosure, a sensor is understood to be a device for detecting a physical quantity and converting it into an electrical signal.

Preferably, the orbital welding head has a housing which adjoins the chamber and which, for example for a user, forms a handle or a housing for operating or switching elements and/or the motor, and the electronic circuit is arranged in the housing.

A value is information regarding a certain extent of a technical quantity. Preferably, the value is embodied/encoded, preferably digitally, as the state of electrical voltages, magnetizations, or optical states. Preferably, a value is given in the form of a technical signal, e.g. an electrical, (electro) magnetic, optical, and/or acoustic analog, preferably digital, signal, depending on the time. A value and a corresponding signal can have one or more dimensions and can thus define a value vector. A measurand is a value that is determined by a sensor.

The base controller can be configured such that a stored welding process program can be loaded from a memory in order to control or regulate the welding process.

The orbital welding head can have a position sensor that is configured in order to generate a position value. The position sensor is preferably a gyroscope sensor. The position sensor is configured in order to measure a position or change in position with respect to at least one, preferably two, particularly preferably three different spatial axes.

The welding process program preferably includes a table or function in which one or more parameters (e.g. current strength) for controlling or regulating the welding current source are stored or calculated for a particular angular position of the welding electrode relative to the welding electrode holder.

In another embodiment of the orbital welding apparatus, it is provided that the electronic circuit is configured in order to store
  a) a number and/or a duration and/or a maximum current and/or a current accumulated over time corresponding to an electrical charge of the welding processes performed with the welding electrode or the orbital welding head and/or arcs and/or
  b) a number of certain vibrations, e.g. exceeding one or different threshold values, and/or
  c) a service life of the motor
  as one or more load values in the memory that describe the load on the orbital welding head.

In a further method according to the disclosure, a corresponding storage is carried out.

These load values allow for a good prediction of anticipated part failures.

In a further embodiment of the orbital welding apparatus, it is provided that the orbital welding apparatus, preferably the orbital welding head, has a load sensor, and the electronic circuit or the base controller is configured in order to determine one or more of the load values from a measurand of the load sensor.

A corresponding determination is made in a further method according to the disclosure.

The load values are thereby measurable by means of the orbital welding apparatus.

The load sensor preferably has a current sensor (e.g. current sensor of the motor current or current conducted into the welding electrode) and/or an acceleration sensor (to measure vibrations). The acceleration sensor is preferably a position sensor. Preferably, it is the same sensor that already serves as the position sensor according to the development examples above.

Preferably, the load sensor is comprised of various elements that are preferably arranged in the orbital welding head and the welding current source housing.

In a further orbital welding apparatus according to the disclosure, it is provided that the orbital welding head has the load sensor at least partially, wherein the orbital welding head has a battery, wherein the orbital welding head is arranged in order to drive the part of the load sensor that has orbital welding head using the electrical energy supplied by the battery and to store one or more of the load values into the memory by means of the electronic circuit.

In a further method according to the disclosure, the load sensor is operated and stored accordingly.

This also takes into account loads on the orbital welding head that occur when the orbital welding head is not connected to the welding current source, e.g. during transport or warehousing.

BRIEF DESCRIPTION OF THE DRAWINGS

The disclosure will now be further illustrated by means of exemplary drawings. The following are shown.

DETAILED DESCRIPTION

Figure 1:
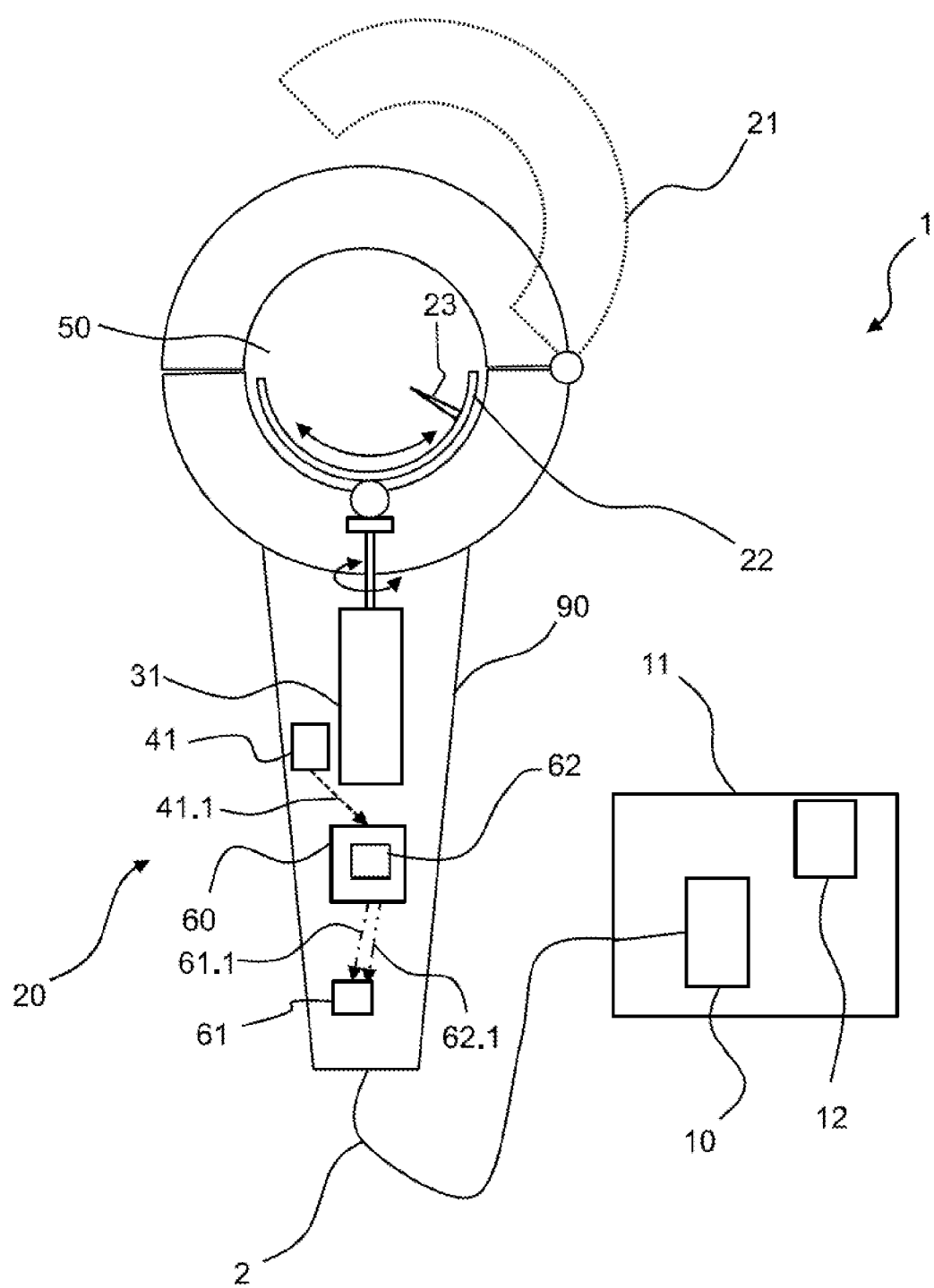
FIG. 1 a first embodiment of an apparatus according to the disclosure.

The following is a more detailed description of FIG. 1. The configuration is such that the orbital welding apparatus 1 has a welding current source 10 in a welding current source housing 11 and therein a base controller 12 and an orbital welding head 20 that is separate from the welding current source housing 11 but connected to the welding current source 10 by means of a cable 2, wherein the orbital welding head 20 has a tube mount 21 and a welding electrode holder 22 rotatably supported opposite the tube mount 21 for mounting the welding electrode 23, wherein the orbital welding apparatus 1 has an electric motor 31 actuated by the base controller 12 of the orbital welding apparatus 1, said motor being configured in order to drive the welding electrode holder 22 and thus rotate it opposite the tube mount 21, wherein the orbital welding head 20 has a chamber 50 for inert gas which is configured in order to surround and essentially terminate outwardly a welding electrode 23 of the orbital welding head 20 during a welding process, wherein the orbital welding head 20 has an electronic circuit 60 in the form of a digital controller, wherein the electronic circuit 60 is connected:
  to a position sensor 41, which the orbital welding head 20 has in this case, wherein the position sensor 41 is configured in order to generate a position value 41.1; and/or
  to a memory 61, which the orbital welding head 20 has in this case, wherein the electronic circuit 60 is configured in order to store one or more load values 61.1 and/or one or more electrode load values 61.2 in the memory 61.

When operating the orbital welding apparatus 1, it is provided that current is passed from the welding current source 10 to the orbital welding head 20 by means of the cable 2, wherein the welding electrode holder 22 is driven by means of the motor 31 and is rotated opposite the tube mount 21 of the orbital welding head 20, wherein, during a welding process, the welding electrode 23 of the orbital welding head 20 is surrounded by the chamber 50 for inert gas and is essentially terminated outwardly, wherein the electronic circuit 60 of the orbital welding head 20 is operated, wherein, by means of the electronic circuit 60:
  the position value 41.1, generated by the position sensor 41, which has the orbital welding head 20 in this case, is processed; and/or
  the one or more load values 61.1 that describe the load on the orbital welding head 20 in and of themselves, and/or the one or more electrode load values 62.1 that describe the load on the welding electrode 23 to the memory 61, are stored.

The welding current or a value derived from the welding current can be specific to the load of the orbital welding head 20 as well as the load of the welding electrode 23, whereas the voltage applied to the welding electrode 23 above the arc is primarily specific to the welding electrode 23. The electronic circuit 60 is equipped with a module 62 for determining an electrode load value 62.1. The electrode load value 62.1 describes the maintenance state of the welding electrode, said state being indicative of a measure of wear on the welding electrode 23.

The electrode load values can have one or more of the following parameters:

The welding voltage measured at the welding electrode. Taking into account the applied welding current, the currently measured voltage can be used in order to directly determine the state of the welding electrode. However, it can also make sense to measure and store the voltage absolutely or as a ratio of the welding current during each individual welding operation in order to be able to track the change in the state of the welding electrode on the basis of the development of the voltage compared to the current.

The resistance measured at the electrode. This resistance is the ratio between the measured voltage and the applied welding current. When the resistance changes significantly, this means high wear on the electrode.

All electrical work performed on the welding electrode or the entire electrical charge flowing through the welding electrode. Both are measurands that are a measure of the continuous load on the welding electrode. The welding electrode must be replaced when predetermined, empirically calculated threshold values are reached.

The total electrical active energy performed by the welding electrode. The electrical active energy is a very meaningful electrode load value when applying AC current to the welding electrode.

The maximum current per welding operation or the electrical charge per welding operation or the electrical work or active energy per welding operation. These electrode load values, which are specific to the individual welding operation, can be measured and stored and evaluated statistically.

Total operating time. The total operating time with which the electrode is operated, i.e. the time during which current flows through the welding electrode, is a very significant electrode load value. As soon as a predetermined, empirical threshold is reached, the latter must be replaced for the entire maximum operating time of a welding electrode.

The maintenance state value of the welding electrode 23 is determined from one or preferably a plurality of these electrode load values. The maintenance state value is preferably a dimensionless quantity, which indicates the maintenance state between 1 and 0 or between 100% and 0%, respectively, wherein 1 or 100% means an unused welding electrode 23 and 0 and 0% means a worn welding electrode needing to be replaced.

The electrode load values are physical quantities, which are either measured with a sensor, such as voltage, temperature, gas current, or physical quantities predetermined by the base controller 12, such as the welding current. In the present embodiment, the supplied welding current is regulated by the base controller 12. It is a pulsed DC current with pulses of alternating large and small current strengths, so that the average current strength can be specifically adjusted by the duration of the pulses. In principle, average current strengths of 5 A to 180 A are possible. Typically, average current strengths are applied in the range of 5 A to 100 A.

As discussed above, the maintenance state value is preferably determined from one or more of these electrode load values. However, an electrode load value can also be used directly as a maintenance state value. This applies above all to the measured voltage or the measured resistance, respectively.

The measured voltage can directly indicate the wear state of the welding electrode at a constant current or a predetermined current. The same applies to the measured resistance of the arc.

However, a dimensionless quantity is preferred as a maintenance state value, because the electrode load values have varying validity regarding the wear state for different types of welding electrodes.

The preferably used welding electrodes are made from tungsten or a tungsten alloy, respectively. They can be of different shapes and can differ, in particular, in the shape of their tip. Thus, the determination of the maintenance state can be dependent on the type of welding electrode and, accordingly, different algorithms can be provided for determining the maintenance state value for the welding electrode 23.

These algorithms are used in order to assign the corresponding electrode load values to the level of wear condition of the corresponding welding electrode, which is represented by the maintenance state value.

Preferably, the maintenance state value is determined on the basis of a plurality of electrode load values.

The maintenance state value can generally be determined from different combinations of the measured voltage of the welding current and time. These are the preferred electrode load values for determining the maintenance state value. However, still further electrode load values can be used alternatively or in combination, such as a temperature measured in the orbital welding head, in particular in the chamber 50, the inert gas flow, and/or the number of welding operations.

The electronic circuit 16 preferably has a microprocessor controller, which can be configured by one or more software modules in order to perform a great variety of functions. A monitoring module 62 can be realized as such a software module. With monitoring module 62, the maintenance state values of the welding electrode are used in order to monitor whether unacceptable wear on the welding electrode has occurred, in order to then issue a corresponding alarm or warning signal. This alarm or warning signal can be output in multiple stages such that, for example, the user is notified early on that the welding electrode 62 is to be replaced. Different threshold values for triggering the different alarm and warning signals can be provided for this purpose. At a certain threshold, an alarm or warning signal can be output, which means that an immediate replacement of the welding electrode is required. The alarm or warning signal can also cause the continued operation of the orbital welding head to be automatically prevented and not able to proceed until after the welding electrode has been replaced.

This can be the case, for example, when the corresponding alarm/warning signal 62.1 is transmitted to the base controller 12, which then prevents a further supply of current. However, a switching device can also be provided in the orbital welding head itself, with which the further supply of current to the welding electrode after such an alarm or warning signal can be prevented.

Depending on the configuration, the apparatus 1 can also have the position sensor 41, in addition to the memory 61.

Here, the cable 2 has a minimum length of 2 m. The tube mount 21 is a pincer-like clamping mount. The chamber 50 is configured such that the tube pieces that are to be welded together are surrounded by the chamber 50 at the ends to be joined. The chamber 50 has an input, e.g. with a hose connector, for inert gas, with which the chamber can thus be filled. The chamber 50 is designed such that the welding electrode 23 can be rotated about the tube pieces to be welded in the chamber 50. Here, the orbital welding head 20 has a housing 90, which adjoins the chamber 50 and which, for example for a user, forms a handle or a housing for operating or switching elements and/or the motor 31, and the electronic circuit 60 is arranged in the housing 90.

The configuration is such that the position sensor 41 is arranged in a stationary relative position to the tube mount 21 and in a movable relative position to the welding electrode holder 22, and the position value 41.1 represents an orientation of the tube mount 21 with respect to gravity. Here, the position sensor 41 is arranged in the housing 90.

The electronic circuit 60 can also be configured such that the following load values 61.1, which describe the load on the orbital welding head 20 in and of themselves, are sensed:
a) a number and/or a duration and/or a maximum current and/or a current accumulated over time corresponding to an electrical charge
of the welding processes performed with the welding electrode 23 or the orbital welding head 20 and/or arcs and/or
b) a number of certain vibrations, e.g. exceeding one or different threshold values, and/or
c) a service life of the motor 31.

Figure 2:
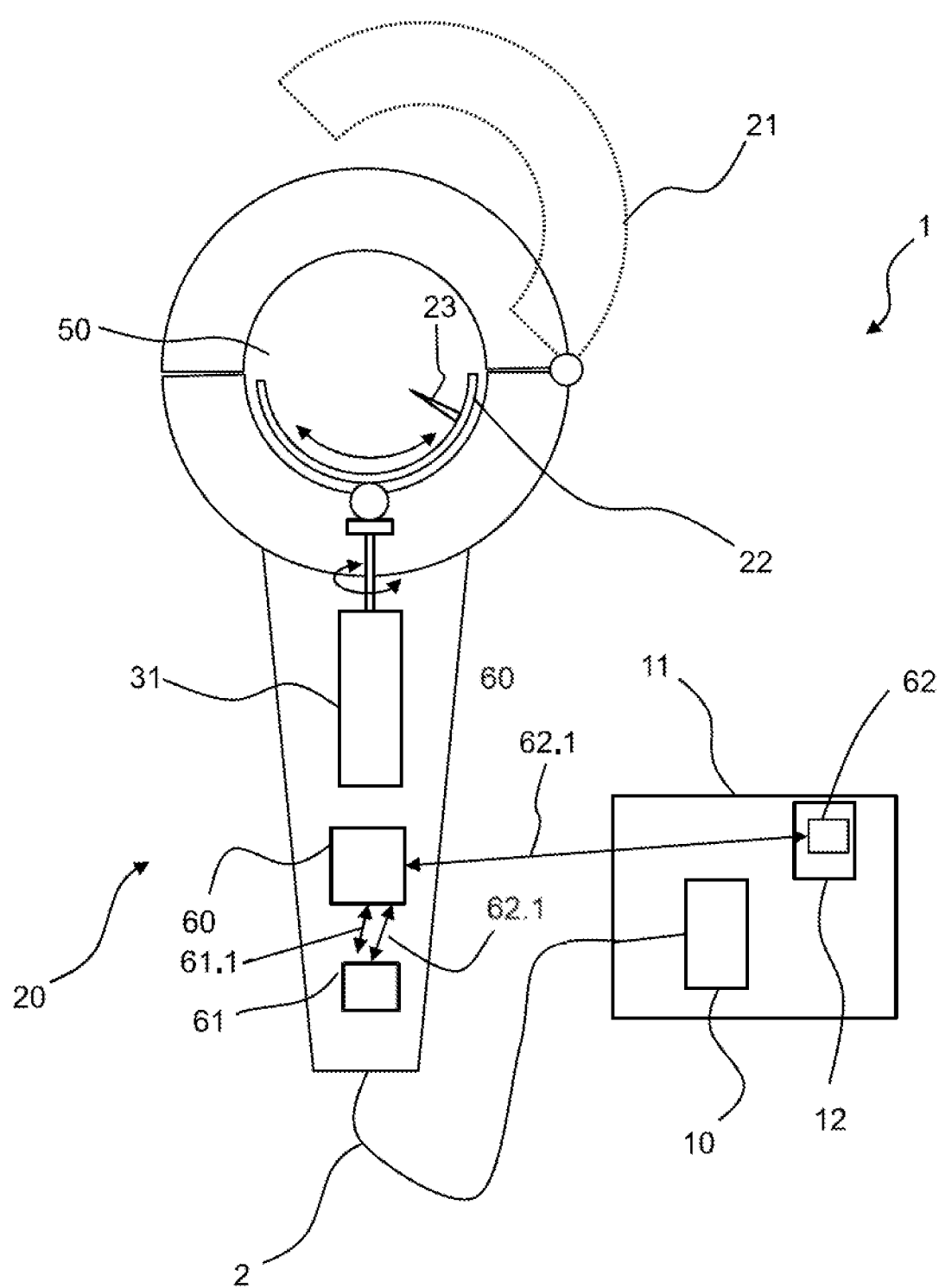
FIG. 2 on the basis of the first embodiment, a second embodiment of an apparatus according to the disclosure.

According to a further embodiment, the monitoring module 62 can also be provided on the base controller 12 (FIG. 2). A bidirectional digital data link is formed between the base controller 12 and the electronic circuit, wherein communication interfaces are provided on both the base controller 12 and the electronic circuit 60, via which the base controller 12 and the welding current source housing 11 can communicate bidirectionally with the electronic circuit 60 and the orbital welding head 20, respectively. The electrode load values 62.1 stored in the memory 61 or the maintenance state values derived therefrom can thus be read in order to monitor the welding electrode state.

The bidirectional data link can be a radio data link. This radio data link can be configured according to a radio standard, such as Bluetooth or W-LAN. However, the bidirectional data link can also be wired, wherein additional data lines are preferably integrated in the cable 2.

By contrast to the exemplary embodiment shown in FIG. 1, the exemplary embodiment shown in FIG. 2 does not have a position sensor 41. In the context of the disclosure, it is of course also possible for the orbital welding head 23 to be equipped with a position sensor 41 when the monitoring module 62 is configured in the base controller 12.

In the context of the disclosure, it is also possible to provide a monitoring module in both the orbital welding head 23 and the base controller 12. For example, the monitoring module in the orbital welding head can generate certain alarm or warning signals that are output with a simple display device (e.g. one or more LEDs) on the orbital welding head. The monitoring module on the base controller 12 can execute more complex monitoring algorithms, which, in particular, calculate and output a measure of the still available service life of the welding electrode 23. This allows a user of the orbital welding apparatus 1 to recognize how long the welding electrode 23 can still be used and to include this in the planning of his or her welding work.

The monitoring module(s) 62 can be configured such that, after the deployment of a new welding electrode 23, a reference for the electrode load values 62.1 and then a reference for the maintenance state values, respectively, are initially determined, which describe the state at the beginning of the use of this welding electrode 23. These reference values are stored in the memory 61. Further electrode load values and maintenance state values are determined during the lifetime of the welding electrode, wherein these values are evaluated in relation to the reference values.

This evaluation can be performed by determining an overshooting or undershooting of a predetermined threshold value with respect to the reference value. For example, the threshold is predetermined by a factor multiplied by the reference value. If this factor is, for example 0.8, this means that the threshold is 0.8 times the reference value.

A plurality of reference values can also be initially sensed, which define a particular curve of the electrode load values and the maintenance state values, respectively.

If the measured electrode load values or maintenance state values deviate from this curve by a predetermined amount, then this can also be assessed as an unacceptable wear on the welding electrode, as explained above.

By using one or more reference values obtained at the beginning of the service life of the welding electrode 23, it is possible to carry out the method performed with the monitoring module(s) in order to monitor the welding electrode 23, regardless of the type of the respective welding electrode, because different reference values are determined for different types of welding electrodes. Different threshold values are thus determined, which can be overshot or undershot and/or can determine different curves of the electrode load values and maintenance state values that describe the operation of the orbital welding head 20 with a correctly functioning welding electrode 23.

The monitoring of the state of the welding electrode 23 ensures that the welding seams generated with the welding apparatus correspond to the quality required by the respective user.

In addition, the useful life of the welding electrode 23 can often be extended without impairing the quality of the welds in comparison to conventional methods in which the welding electrode is generally replaced after a certain number of welding operations.

When using a position sensor 41, it can also be expedient to provide a battery in the orbital welding head 20 so that load values sensed by the position sensor can also be sensed when the orbital welding head 20 is not connected to a welding current source housing 11 or a base controller 12.

The exemplary embodiments discussed above have an essentially terminated chamber 50, which is filled with inert gas upon welding. The disclosed embodiments can also be realized on an open orbital welding head that does not have such a chamber. Here, the inert gas can flow freely.

REFERENCE NUMERALS

1 Orbital welding apparatus
2 Cable
10 Welding current source
11 Welding current source housing
12 Base controller
20 Orbital welding head
21 Tube mount
22 Welding electrode holder
23 Welding electrode
31 Motor
41 Position sensor
41.1 Position value
42 Load sensor
50 Chamber
60 Electronic circuit
61 Memory
61.1 Load value
62.1 Electrode load value
62 Monitoring Module

What is claimed is:

1. An orbital welding head for an orbital welding apparatus for connecting by means of a cable to a welding current source in a welding current source housing, said current source being equipped with a base controller, comprising:
   a tube mount and a welding electrode holder rotatably supported opposite the tube mount for mounting a welding electrode;
   a motor, which is configured in order to drive the welding electrode holder and thus rotate the welding electrode holder opposite the tube mount;
   an electronic circuit comprising a memory, which is arranged in the orbital welding head, wherein the electronic circuit is configured to:
      store one or more electrode load values of the welding electrode, and the electronic circuit of at least one of the orbital welding head or the base controller is configured such that a maintenance state value of the welding electrode is determined on the basis of the electrode load values, said state being a measure of the wear on the welding electrode based on a number of welding operations, an arc energy, or time; and
      monitor the curve of at least one of the determined electrode load values or maintenance state values; and
      identify unacceptable wear on the welding electrode based on at least one of:
         identifying that the electrode load values are outside of a range set by a predetermined deviation from a location on a predetermined curve, the location on the predetermined curve being based on the number of welding operations, the arc energy, or the time; or
         identifying overshooting or undershooting of the at least one of the determined electrode load value or the maintenance state value based on a location on a predetermined curve, the location on the predetermined curve being based on the number of welding operations, the arc energy, or the time.

2. The orbital welding head according to claim 1, wherein the electronic circuit is configured such that one or more electrode load values are initially stored as reference values, the curve is set based on the reference values, and the wear on the welding electrode is determined by comparing one or more further electrode load values to the curve.

3. The orbital welding head according to claim 1, further comprising a monitoring module configured to:
   automatically monitor the deviation from at least one of the predetermined curve or the undershooting or overshooting and;
   when unacceptable wear is detected, generate a warning, wherein the monitoring module is configured such that a deviation threshold value for the at least one of the predetermined deviation or the threshold for overshooting or undershooting this threshold value is manually settable and changeable.

4. The orbital welding head according to claim 1, wherein the one or more electrode load values have one or more of the following parameters:
   measured voltage at the welding electrode, measured resistance on the electrode,
all electrical work performed at the welding electrode,
total electrical charge flowing through the welding electrode,
all electrical active energy performed by the welding electrode,
maximum current per welding operation,
electrical charge per welding operation,
electrical work or active energy per welding operation,
total operating time.

5. The orbital welding head according to claim 1, further comprising a resetting device for resetting the one or more electrode load values when replacing a welding electrode.

6. The orbital welding head according to claim 1, further comprising an output device on the orbital welding head to indicate a maintenance state of the welding electrode located in the orbital welding head.

7. The orbital welding head according to claim 1, wherein the orbital welding head comprises a communication device for communicating with the base controller via a bidirectional digital data link.

8. An orbital welding apparatus having a welding current source in a welding current source housing, said current source being equipped with a base controller, and an orbital welding head according to claim 1.

9. The orbital welding apparatus according to claim 8, wherein the base controller comprises a base communication device for communicating via the data link with the communication device of the orbital welding head, wherein the base controller is configured in order to read one or more electrode load values, which are present on at least one of the base controller or at the welding current source, or are measured at the welding current source by means of one or more sensors, and the base controller is configured to pass the one or more electrode load values on to the orbital welding head.

10. The orbital welding apparatus according to claim 8, wherein the base controller, when executing a welding program, considers at least one of A) the maintenance state of the welding electrode as defined by the electrode load value(s) stored in the orbital welding head, wherein a respective welding program is adjusted to the maintenance state of the welding electrode, or B) when selecting one of a plurality of welding programs, considers the maintenance state of the welding electrode.

11. A method for operating an orbital welding apparatus, comprising:
passing current from a welding current source by means of a cable to an orbital welding head;
driving a welding electrode holder on the orbital welding head via a motor, wherein the welding electrode holder is rotated opposite a tube mount of the orbital welding head;
surrounding a welding electrode of the orbital welding head with inert gas during a welding process;
storing one or more electrode load values of a welding electrode are stored in a memory via an electronic circuit which is arranged in the orbital welding head; and
storing, in a memory arranged in the orbital welding head, one or more electrode load values of a welding electrode and determining wear on the welding electrode by at least one of:
comparing that the electrode load values to a range set by a predetermined deviation from a location on a predetermined curve, the location on the predetermined curve being based on a number of welding operations, an arc energy, or a time; or
identifying whether the determined electrode load value or the maintenance state value has overshot or undershot at least one of the determined electrode load value or the maintenance state value based on a location on a predetermined curve, the location on the predetermined curve being based on the number of welding operations, the arc energy, or the time.

\* \* \* \* \*